United States Patent
Smith et al.

(10) Patent No.: US 6,931,468 B2
(45) Date of Patent: Aug. 16, 2005

(54) METHOD AND APPARATUS FOR ADDRESSING MULTIPLE DEVICES SIMULTANEOUSLY OVER A DATA BUS

(75) Inventors: Robert B. Smith, Loveland, CO (US); Bradley D. Winick, Fort Collins, CO (US); Edward A Cross, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 444 days.

(21) Appl. No.: 10/067,932

(22) Filed: Feb. 6, 2002

(65) Prior Publication Data

US 2003/0149824 A1 Aug. 7, 2003

(51) Int. Cl.[7] .............................................. G06F 13/00
(52) U.S. Cl. ......................................... 710/104; 710/9
(58) Field of Search .......................... 710/3, 9, 36, 104, 710/305

(56) References Cited

U.S. PATENT DOCUMENTS 6,230,225 B1    5/2001   Olarig et al.

OTHER PUBLICATIONS

"The 12C–bus Specification," Version 2.1, Phillips Semiconductors (Jan. 2000).

"A Tutorial Introduction to HPIB," Version 4.1, Greg Goebel (Jan. 1999), http://ftp.agilent.com/pub/mpusup/pc/iop/hpibut/ib0$_{13}$ toc.html.

*Primary Examiner*—Glenn A. Auve (57) ABSTRACT

Techniques are provided for simultaneously addressing multiple devices on a data bus, such as by transmitting over a data bus a single message that is received and processed by multiple devices on the bus. Multiple devices may be simultaneously addressed using the standard bus architecture and protocol, without affecting the operation of other devices on the bus. In particular, a master device may address a first subset of the plurality of devices on the bus using a primary address shared by the first subset of the plurality of devices. The master device may address a second subset of the plurality of devices using a secondary address shared by the second subset of the plurality of devices. The second subset is a subset of the first subset. The master device may then transmit information over the bus to the second subset of the plurality of devices.

20 Claims, 4 Drawing Sheets

METHOD AND APPARATUS FOR ADDRESSING MULTIPLE DEVICES SIMULTANEOUSLY OVER A DATA BUS

CROSS REFERENCE TO RELATED APPLICATIONS

This application is related to a commonly-owned and concurrently-filed patent application Ser. No. 10/068,029, entitled "Method and Apparatus for Ascertaining the Status of Multiple Devices Simultaneously Over a Data Bus," which is hereby incorporated by reference in its entirety.

BACKGROUND

1. Field of the Invention

The present invention relates to data communications in computer systems and, more particularly, to improved data communications among computing devices using a data bus.

2. Related Art

A conventional computer system typically includes a central processing unit (CPU), main memory, and a number of devices that are in communication with each other and the CPU over a data bus, sometimes referred to as an Input/Output (I/O) bus. The CPU, for example, transmits commands and data to the devices (such as hard disk drives, printers, and displays) over the data bus, and vice versa. A variety of conventional data buses exist, such as the Small Computer System Interface (SCSI) bus, the Industry Standard Architecture (ISA) bus, the Peripheral Component Interface (PCI) bus, and the Inter-IC ($I^2C$) bus.

Devices typically communicate with each other over a data bus using messages that are defined according to a predetermined protocol. Furthermore, each of the devices is typically assigned a unique bus address. Each message that is transmitted over the data bus addresses the device that is the target of the message using the target device's unique bus address. Each of the devices on the bus typically determines whether a particular message is addressed to it by examining the address specified by the message and comparing it to the device's unique bus address.

Data buses may include any number of data lines, each of which is responsible for transmitting one bit of information at a time. The number of data lines in a bus is typically referred to as the "width" of the bus. Typical bus widths range from 1 to 64 bits. The wider the bus, the higher the potential throughput for a given bandwidth or clock rate. Data buses with one data line are generally referred to as "serial" buses, while data buses with two or more data lines are generally referred to as "parallel" buses.

Parallel buses are typically used when high-speed data transfer is required. Wide data buses, however, are relatively expensive and are often difficult to implement over long transmission distances.

Serial buses are relatively inexpensive and are ideal for implementing long-distance data transmissions. In a serial bus architecture, each bit of a data byte or word (referred to herein as a "datum") is sent sequentially over the serial bus's single data line until transmission of the datum is complete. The protocol associated with a serial bus typically specifies how data transmitted over the bus are to be delimited and how the start and end of each data transfer is to be identified.

The sequential nature of data transfer over a data bus imposes limitations on the speed with which information may be transmitted over the bus. In particular, the speed with which information may be transmitted over a serial bus is limited by the fact that there is only a single data line over which individual bits are transmitted sequentially. In addition, it is typically only possible to address one device on a serial bus at a time. Addressing multiple devices on a serial bus typically requires addressing each of the multiple devices in sequence.

It is sometimes required that data communications be synchronized among multiple devices on a data bus. The sequential nature of bus communications, however, can place significant limitations on how efficiently and accurately synchronization can be performed, particular when a serial bus is being used. For more exact synchronization, some systems have used a separate control line.

What is needed, therefore, are techniques for improving the efficiency of communications over a data bus.

SUMMARY

In one aspect of the present invention, techniques are provided for addressing multiple devices simultaneously over a data bus. For example, in one embodiment of the present invention, a method is provided for use in a computer system including a data bus and a plurality of devices coupled to the data bus. The method includes steps of addressing a first subset of the plurality of devices using a primary address shared by the first subset of the plurality of devices, addressing a second subset of the plurality of devices using a secondary address shared by the second subset of the plurality of devices (wherein the second subset comprises a subset of the first subset), and transmitting information over the data bus to the second subset of the plurality of devices.

The step of addressing the first subset of the plurality of devices may include a step of transmitting the primary address over the data bus, and the step of addressing the second subset of the plurality of devices may include a step of transmitting the secondary address over the data bus. The data bus may be any kind of data bus, such as a serial bus (e.g., an $I^2C$ bus) or a parallel bus. The second subset of devices may be any subset of the first subset of devices, such as a single one of the first subset of devices or all of the first subset of devices.

In another embodiment of the present invention, a method is provided that is performed by a first one of a plurality of devices in a computer system including a data bus. The method includes steps of receiving a primary address over the data bus from a second one of the plurality of devices, receiving a secondary address over the data bus from the second one of the plurality of devices, and determining whether the primary address is associated with the first one of the plurality of devices. If it is determined that the primary address is associated with the first one of the plurality of devices, the first one of the plurality of devices determines whether the secondary address is associated with the first one of the plurality of devices. If it is determined that the secondary address is associated with the first one of the plurality of devices, the first one of the plurality of devices receives information from the second one of the plurality of devices over the data bus.

Other features and advantages of various aspects and embodiments of the present invention will become apparent from the following description and from the claims.

DETAILED DESCRIPTION

In one aspect of the present invention, techniques are provided for simultaneously addressing multiple devices on a data bus (such as a serial data bus or a parallel data bus). In particular, techniques are provided for transmitting over a data bus a single message that is received and processed by multiple devices on the bus. Furthermore, techniques are disclosed for simultaneously addressing multiple devices on a data bus using the standard bus architecture and protocol, without affecting the operation of other devices on the bus.

In one embodiment, each device on the bus has both a primary address and a secondary address. A plurality of devices on the bus may share a common primary address. A master device on the bus may simultaneously address the plurality of devices by addressing them using the common primary address according to the bus protocol. The master device may address a subset of the plurality of devices using a secondary address associated with the subset.

More generally, the master device may transmit a message to the device(s) corresponding to a particular primary-secondary address pair by first addressing the device(s) using the primary-secondary address pair (by transmitting the address pair over the bus) and then transmitting the content of the message over the bus. Devices on the bus are configured to receive and process messages that are addressed to them using primary-secondary address pairs.

The techniques described generally above and described in more detail below may be used to efficiently communicate with multiple devices on a data bus. In particular, the ability to simultaneously address multiple devices on the bus may increase the extent to which data operations among the multiple devices may be synchronized. Other features and advantages of various aspects and embodiments of the present invention will become apparent from the following description.

Figure 1:
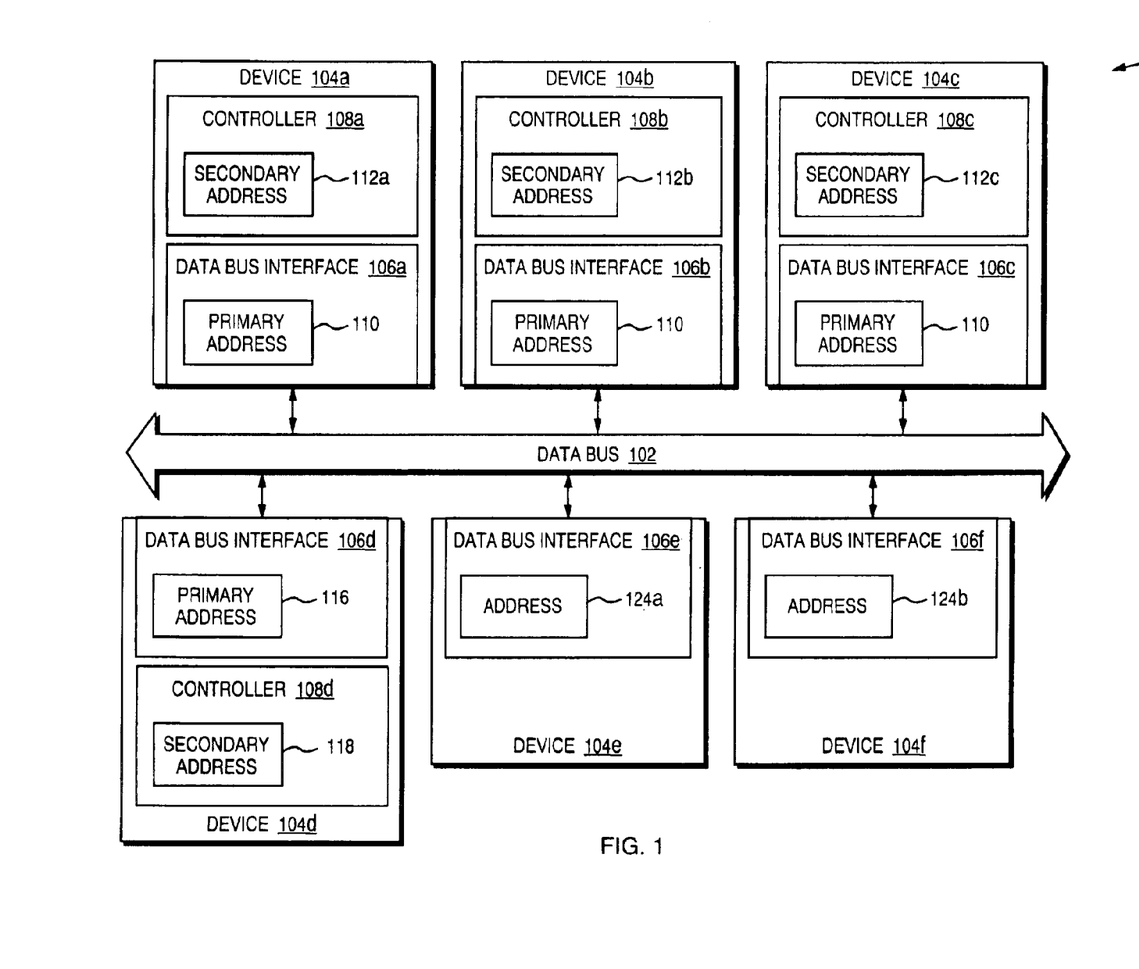
FIG. 1 is a schematic block diagram of a computing system including a data bus and a plurality of computing devices according to one embodiment of the present invention.

Referring to FIG. 1, a schematic block diagram is shown of a computer system 100 including a data bus 102 and a plurality of computing devices 104a–f according to one embodiment of the present invention. Although the data bus 102 may be any data bus, in one embodiment the data bus 102 is an Inter-IC (I²C) bus. The architecture and operation of the I²C bus is defined in a document entitled "The I²C-Bus Specification," available from Philips Semiconductors. Version 2.1 of "The I²C-Bus Specification," dated January 2000, is incorporated by reference herein in its entirety. Although the I²C bus is a serial data bus, the data bus 102 may be either a serial bus or a parallel bus.

The devices 104a–f that are coupled to the data bus 102 are capable of communicating with each other over the data bus 102 using a physical architecture and communications protocol associated with the bus 102. The I²C bus specification referenced above, for example, defines such a physical architecture and communications protocol. The devices 104a–f include data bus interfaces 106a–f, respectively, for communicating with each other over the data bus 102 in accordance with the bus's architecture and protocol. The data bus interfaces 106a–f may, for example, be standard I²C hardware interfaces. One such interface is provided in the model PIC16C72a microprocessor available from Microchip Technology Inc. of Chandler, Ariz.

As described above, each device that is coupled to a bus is typically provided with a unique address on the bus. The first datum in a message transmitted over a bus is typically an address. Each device on the bus receives and examines the address to determine whether it is the device's unique bus address. If a device determines that the address transmitted over the bus is the device's unique bus address, the device receives and processes the remainder of the message. Otherwise, the device ignores the remainder of the message.

As shown in FIG. 1, conventional devices 104e and 104f are provided with unique addresses 124a and 124b, respectively. As a result, conventional device 104e may be addressed by other devices over the bus 102 using address 124a, and conventional device 104f may be addressed using address 124b. For example, when a message is transmitted over the bus 102, the data bus interface 106e determines whether the address specified in the message matches the address 124a, and the data bus interface 106f determines whether the address specified in the message matches the address 124b. Further details of the operation of the data bus interfaces 106e–f are well-known to those of ordinary skill in the art and will therefore not be described herein.

As described above, in a serial bus architecture such as the I²C bus architecture, it is typically only possible to address one device on the bus at a time. For example, the conventional device 104e may be addressed using the device's address 124a. To address multiple devices on a serial bus, it is typically necessary to address each of the devices individually in some sequence.

In one embodiment of the present invention, techniques are provided for simultaneously addressing multiple devices on the bus 102. For example, techniques are provided for transmitting a single message over the bus 102 that is received and processed by multiple devices on the bus 102.

For example, referring to FIG. 1, devices 104a–d include data bus interfaces 106a–d. As described above, these interfaces 106a–d may be standard interfaces designed for use with the bus 102. Devices 104a–d further include controllers 108a–d, respectively, which have been specially designed to transmit messages over the bus 102 to multiple devices simultaneously and/or to receive messages over the bus 102 that have been transmitted to multiple devices simultaneously.

To provide this ability, each of the devices 104a–d is provided with both a primary address and a secondary address. A particular primary address may be associated with one or more devices on the bus 102. For example, in one embodiment devices 104a–c share a common primary address 110 and have unique secondary addresses 112a–c (i.e., no two of the secondary addresses 112a–c are the same). As a result, primary address 110 identifies the group of devices 104a–c (referred to herein as a "device group"), while a combination of primary address 110 and one of the secondary addresses 112a–c uniquely identifies one of the devices 104a–c. For example, the combination of primary address 110 and secondary address 112b uniquely identifies device 104b.

Similarly, device 104d includes a primary address 116 that differs from primary address 110 and a secondary address 118. The combination of primary address 116 and secondary address 118, therefore, uniquely identifies device 104d.

As described in more detail below, however, it is not a requirement of the present invention that a primary-secondary address pair uniquely identify a single device. More generally, a primary address specifies a device group (a subset of the devices on the bus 102), and a secondary address specifies a subset of the device group specified by the primary address. As a result, a primary-secondary address pair may specify any number of devices.

In one embodiment, primary address 110 and primary address 116 are addresses implemented according to the protocol associated with the bus 102. For example, primary addresses 110 and 116 are shown within data bus interfaces 106a–d in FIG. 1 to indicate that such addresses are implemented in the same manner as addresses 124a–b in conventional devices 104e–f. As a result, messages transmitted over the bus 102 using primary address 110, for example, will be delivered to, received, and processed by all of devices 104a–c using the standard architecture and protocol of bus 102 (such as the I$^2$C bus architecture and protocol).

It should be appreciated that the particular number and combinations of primary and secondary addresses shown in FIG. 1 are provided merely for purposes of example and do not constitute limitations of the present invention. There may, for example, be any number of primary addresses and secondary addresses, and any number of devices may have a particular primary address. In one embodiment, however, primary addresses 110 and 116 are unique on the bus 102. In other words, each of the primary addresses 110 and 116 differs from each other and from the addresses 124a and 124b of the conventional devices 104e–f. The reason for making primary addresses 110 and 116 unique on the bus 102 will be described below.

Figure 2A:
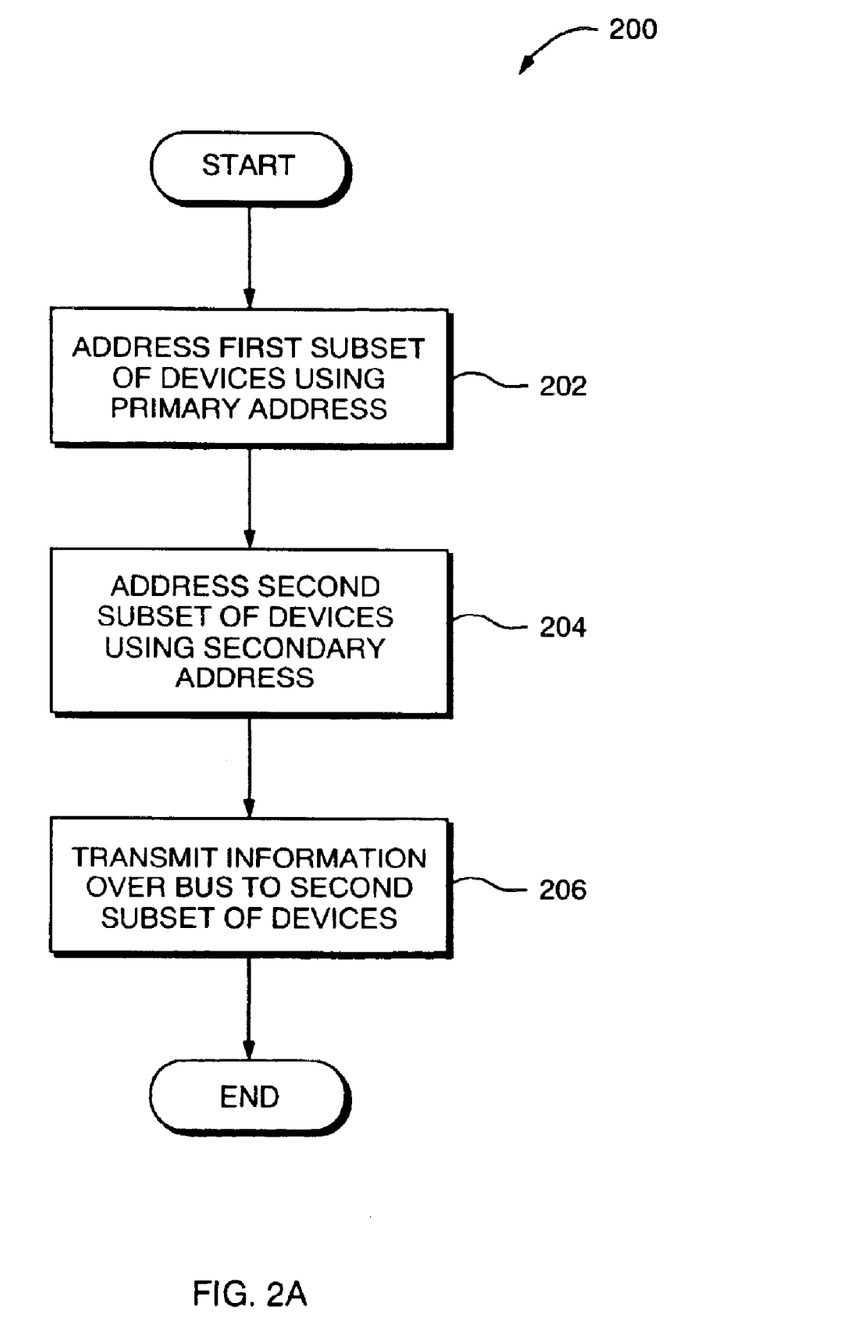
FIG. 2A is a flowchart of a method that is used by a master device to transmit a message over a data bus to one or more slave devices.
Figure 2B:
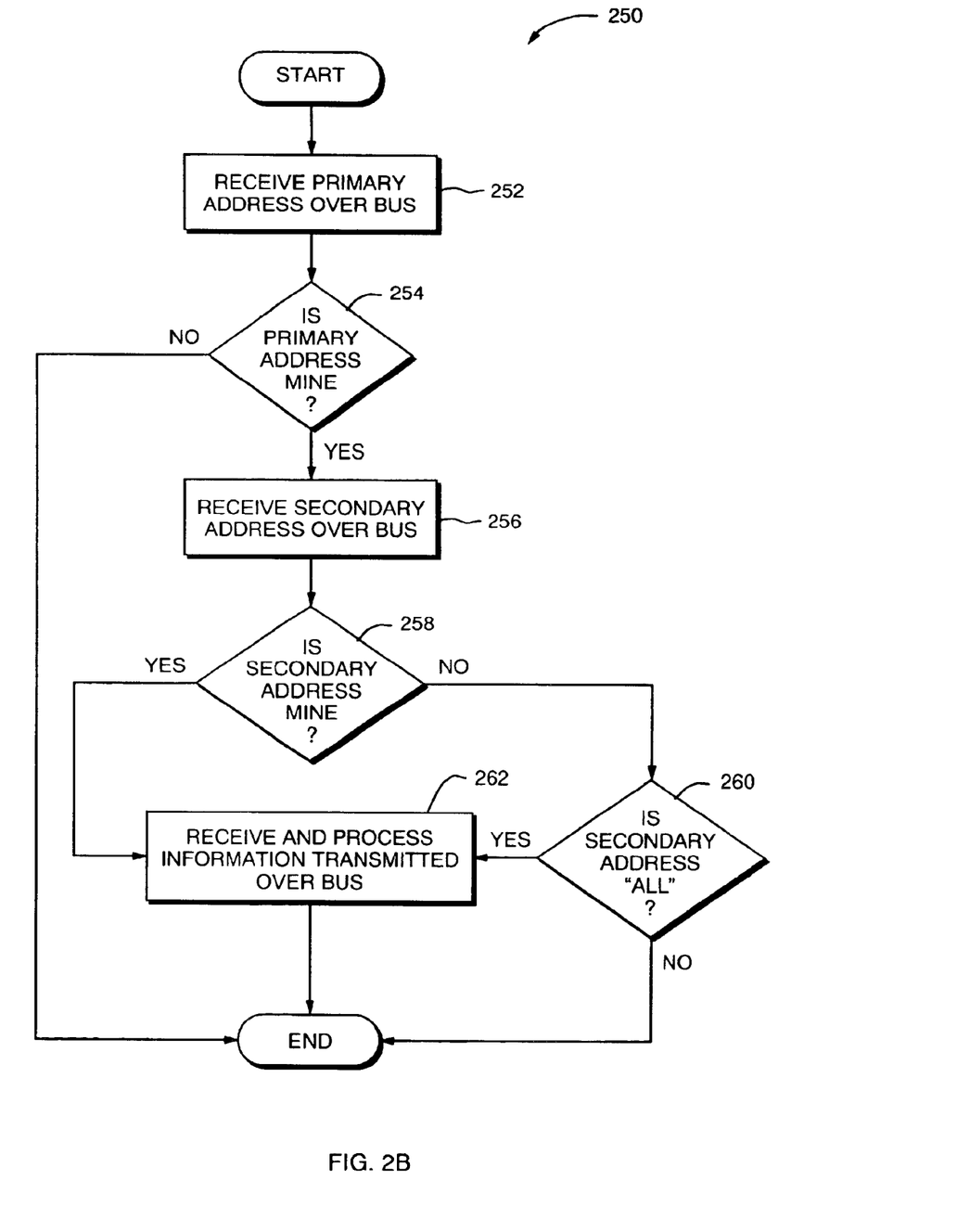
FIG. 2B is a flowchart of a method that is used by a slave device to receive a message transmitted over a data bus to one or more slave devices.

Referring to FIGS. 2A–2B, techniques will now be described for addressing multiple devices simultaneously over the bus 102. Referring to FIG. 2A, a flowchart is shown of a method 200 that may be used by one of the devices 104a–d (referred to herein as the "master device") to transmit a message to one or more of the devices 104a–d over the bus 102. Referring to FIG. 2B, a flowchart is shown of a method 250 that may be used by one or more of the devices 104a–d (referred to herein as "slave devices") to receive a message that has been transmitted to one or more of the devices 104a–d over the bus 102. It should be appreciated that any one of the devices 104a–d may become a master device at a particular time by initiating the transmission of a message over the bus 102, in which case the remaining devices are considered slave devices for purposes of receipt of the message.

Referring to FIG. 2A, the master device addresses a first subset of the devices on the bus 102 using a primary address (step 202). For example, as described above, the first datum in a message transmitted over a data bus is typically an address that addresses a single device on the bus. The primary address transmitted over the bus 102 in step 202 may be transmitted as a conventional address according to the protocol associated with the bus 102.

Referring to FIG. 2B, each slave device receives the transmitted primary address over the bus 102 (step 252) and determines whether the transmitted primary address is the primary address of the slave device (step 254). If a slave device determines that the transmitted primary address is not the slave device's primary address, the slave device ignores the remainder of the message being transmitted by the master device (step 254). Steps 252–254 may be performed by the data bus interfaces 106a–d of the devices 104a–d.

Returning to FIG. 2A, the master device addresses a second subset of the devices on the bus 102 using a secondary address (step 204). The second subset is a subset of the first subset addressed in step 252, and may include any number of devices (such as a single device in the first subset or all of the devices in the first subset). The master device may transmit the secondary address as, for example, a datum according to the protocol associated with the bus 102. For example, in the I$^2$C protocol, the datum following an address is treated as data to be delivered to the addressed device. The secondary address transmitted in step 204 may be transmitted as such a datum according to the I$^2$C protocol.

Although the secondary address is considered to be a datum according to the bus protocol, the slave devices addressed by the primary address receive this datum and interpret it as a secondary address. For example, returning to FIG. 2B, each slave device receives the transmitted secondary address over the bus 102 (step 256) and determines whether the transmitted secondary address is the slave device's secondary address (step 258). If the transmitted secondary address is the slave device's secondary address, the slave device becomes receptive to the remainder of the message transmitted by the master device. If not, the slave device determines whether the secondary address has a special value of "ALL," which indicates that all of the devices in the first subset (specified by the primary address received in step 252) are being addressed. The "ALL" value may be formatted in any way, one example of which is described in more detail below. If the transmitted secondary address has the special value of "ALL," the slave device becomes receptive to the remainder of the message transmitted by the master device. If not, the slave device ignores the remainder of the message.

Returning to FIG. 2A, the master device transmits information to the second subset of devices over the bus 102 (step 206). The information may be any information that may be transmitted over the bus 102, such as a command, data, or a combination thereof. Returning to FIG. 2B, each of the slave devices addressed by the primary and secondary addresses received in steps 252 and 256 receives and processes the information transmitted over the bus 102 (step 262). Steps 256–262 may be performed by the controllers 108a–d of devices 104a–d.

It should be appreciated that the techniques described above with respect to FIGS. 2A–2B may be used to enable multiple devices to be addressed simultaneously over the bus 102 and to enable a single message to be transmitted simultaneously to multiple devices over the bus 102. A particular example will now be described in which the device 104d is the master device and in which devices 104a–c and 104e–f are slave devices.

In this example, the (master) device 104d transmits the primary address 110 over the bus 102 as an address according to the I$^2$C protocol (step 202). This addresses the devices 104a–c, which share the common primary address 110. The data bus interfaces of the (slave) devices 104a–c receive the transmitted primary address and determine whether it matches their own primary address (steps 252–254). Because the transmitted primary address is the primary address 110 shared by the devices 104a–c, the data bus interfaces 106a–c determine that there is a match, and the devices 104a–c become receptive to the remainder of the message being transmitted by the (master) device 104d.

It should be appreciated that the data bus interfaces 106e–f of the conventional devices 104e–f also compare the transmitted primary address 110 to the addresses 124a–b, respectively, and determine that there is no match. The conventional devices 104e–f therefore ignore the remainder of the message being transmitted by the (master) device 104d. Use of the techniques described herein with respect to FIGS. 2A–2B therefore do not interfere with the normal operation of conventional devices coupled to the bus 102.

Assume for purposes of example that (master) device 104d next transmits secondary address 112b over the bus 102 (step 204). The controller of each of the (slave) devices 104a–c receives the transmitted secondary address (step 256) and compares it to the device's own secondary address (step 258). The (slave) devices 104a and 104c will determine that the transmitted secondary address is not their secondary address (step 258), and that the transmitted secondary address does not have the value "ALL" (step 260), and will therefore ignore the remainder of the message transmitted by (master) device 104d. In contrast, (slave) device 104b will determine that the transmitted secondary address is the secondary address 112b of the (slave) device 104b (step 258), and will therefore become receptive to the remainder of the message transmitted by (master) device 104d. Conventional devices 104e–f will receive and ignore the secondary address transmitted in step 204.

Assume for purposes of example that (master) device 104d then transmits information (such as a command and/or data) over the bus 102 (step 206). The information is received and processed by (slave) device 104b (step 262); the information is received but ignored by the remaining devices 104a, 104c, and 104e–f.

It should be appreciated that if the (master) device 104d had transmitted the value "ALL" as the secondary address in step 204 in the example above, then all of the (slave) devices 104a–c would have received and processed the information transmitted by the (master) device 104d over the bus 102 (step 262).

Although in the examples above, the master device may address either one device in a device group (such as the device group consisting of devices 104a–c) or all of the devices in a device group, it should be appreciated that in other embodiments the master device may address any number of devices in a device group. For example, the secondary address transmitted by the master device in step 204 may be encoded with a pattern that specifies a subset of the devices in the device group addressed by the primary address transmitted in step 202. Alternatively, each of the devices 104a–d may further be provided with a tertiary address, in which case a primary-secondary address pair may be used to specify a plural subset of a device group, and a primary-secondary-tertiary address triplet may be used to specify a single one of the devices in a device group. The techniques just described are provided merely for purposes of example and do not constitute limitations of the present invention.

Figure 3A:
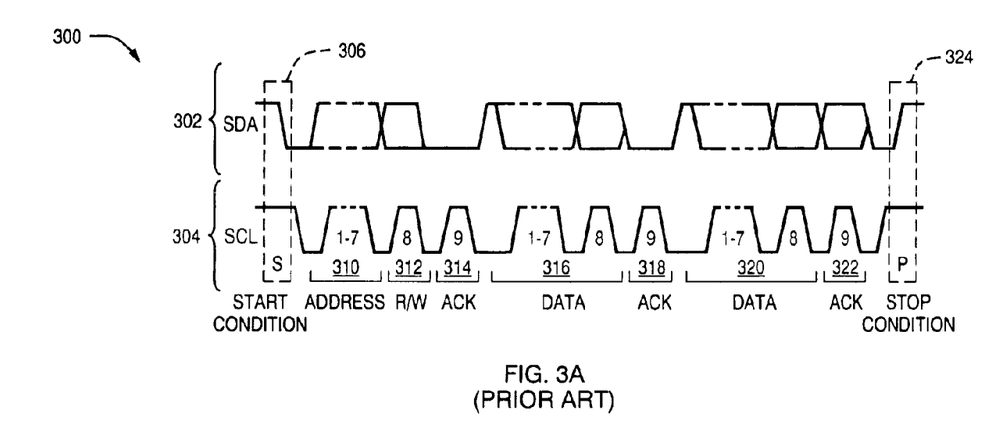
FIG. 3A is a timing diagram of signals transmitted over an I²C bus during transmission of a message over the bus.

Details of one embodiment in which the data bus 102 is an I²C bus will now be described. Referring to FIG. 3A, a timing diagram 300 is shown that illustrates the normal structure of a message transmitted over an I²C bus. The diagram 300 includes a graph 302 representing the serial data line (SDA) of the I²C bus and a graph 304 representing the serial clock line (SCL) of the I²C bus. The generation of clock signals on SCL is the responsibility of master devices; each master device generates it own clock signals when transferring data on the bus.

The message begins with a start bit 306 (in which both the SDA and SCL lines are held high), which indicates the initiation of a message by a master device. According to the I²C-bus specification, a start condition is indicated by a HIGH to LOW transition on the SDA line while the SCL line is HIGH.

As defined by the I²C-bus specification, the first byte of information following the start bit 306 is a 7-bit address 310 of a possible device on the bus. Address 310 is followed by a R/W bit 312, which indicates whether the addressed device is to be read or written. A R/W value of zero indicates a write, while a R/W value of one indicates a read.

Each byte transmitted over an I²C bus is followed by an acknowledge bit. For example, the byte consisting of address 310 and R/W bit 312 are following by an acknowledge bit 314. The acknowledge-related clock pulse is generated by the master. The receiving device must pull down the SDA line during the acknowledge clock pulse so that it remains stable LOW during the HIGH period of this clock pulse. The receiver generates an acknowledge bit after each byte that it receives.

Following the acknowledge bit 314 is a data byte 316 transmitted by the transmitting device to the receiving device. The data byte 316 is followed by an acknowledge bit 318. This is followed by another data byte 320 and acknowledge bit 322. Although messages may include any number of data bytes, the two data bytes 316 and 320 are shown in FIG. 3A for purposes of example. The message concludes with a stop bit 324, indicated by a LOW to HIGH transition on the SDA line while the SCL line is HIGH.

Figure 3B:
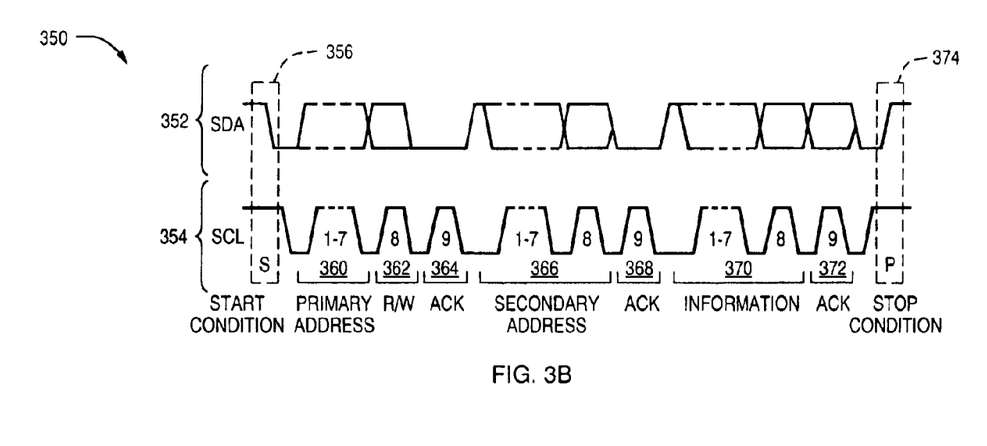
FIG. 3B is a timing diagram of signals transmitted over an I²C bus during transmission of a message over the bus according to one embodiment of the present invention.

Referring to FIG. 3B, a timing diagram 350 is shown that illustrates the structure of a message transmitted over an I²C bus according to one embodiment of the present invention. The diagram 350 includes a graph 352 representing the serial data line (SDA) of the I²C bus and a graph 354 representing the serial clock line (SCL) of the I²C bus.

Note that the structure of the timing diagram 350 (FIG. 3B) is identical to the structure of the timing diagram 300 (FIG. 3A). What differs is the way in which the information transmitted over the bus 102 is interpreted and processed by the devices 104a–d.

More specifically, the message represented by timing diagram 350 begins with a start bit 356 that is identical to the start bit 306 shown in FIG. 3A. What follows is a primary address 360 (see step 202 in FIG. 2A), which has the same structure as the conventional address 310 shown in FIG. 3A. As a result, the primary address 360 may be interpreted by conventional I²C interfaces. Following this are a R/W bit 362 and an acknowledge bit 364 which are the same as the R/W bit 312 and the acknowledge bit 314, respectively. All devices having the primary address 360 will transmit acknowledge bit 314 over the bus 102.

Next is a secondary address 366 (see step 204 in FIG. 2A) having the same structure as the conventional data 316. As a result, the secondary address 366 may be interpreted by the controllers 108a–d of devices 104a–d but ignored by the data bus interfaces 106e–f of conventional devices 104e–f. Next is an acknowledge bit 368 that is identical to the acknowledge bit 318.

What follows is information 370 (see step 206 in FIG. 2A), which has the same structure as data 320. Although only one byte of information 370 is shown, there may be any number of bytes of information. Furthermore, information 370 may represent a command, data, or a combination thereof.

Following information 370 is an acknowledge bit 372 that is identical to acknowledge bit 322. Finally, there is a stop bit 374 that is identical to the stop bit 324.

It should be appreciated that using the techniques just described, a message that addresses multiple devices using a primary-secondary address pair may be transmitted over an I²C bus using the standard I²C bus architecture and protocol without interfering with the normal operation of other devices on the bus.

Some additional implementation issues related to the use of the I²C bus architecture will now be described. Since the primary address 360 is a 7-bit address, the primary addresses 110 and 116 (FIG. 1) may be 7-bit addresses if the data bus 102 is an I²C bus. Any 7-bit pattern may be used as a primary address, so long as the pattern is not the I²C address of any other device on the bus 102.

In one embodiment in which the data bus 102 is an I²C bus, the secondary address 366 (FIG. 3B) actually contains both a command and a secondary address. More specifically, bits 1–4 of the secondary address 366 specify a command, while bits 5–7 specify a secondary address. In this embodiment, receipt by a slave device of a secondary address over the bus (step 256 in FIG. 2B) corresponds to receipt of bits 5–7 of secondary address 366. The slave device determines whether the received secondary address is the slave device's secondary address (step 258) by comparing bits 5–7 of secondary address 366 to the slave device's secondary address. If there is a match, the slave device decodes bits 1–4 of the secondary address 366 and executes the specified command (step 262). Executing the specified command may involve receiving additional data from the master device, such as data 320 (FIG. 3).

Bits 5–7 of the secondary address 366 may be used to encode up to eight different secondary addresses. In one embodiment, however, one value (such as 000 or 111) of bits 5–7 of the secondary is reserved for specifying the special "ALL" value described above with respect to FIG. 2B. As a result, bits 5–7 of a particular secondary address may specify either the value "ALL" or one or seven distinct secondary addresses. Various other techniques for encoding primary and secondary addresses will be apparent to those of ordinary skill in the art and are also within the scope of the present invention.

Bits 1–4 of the secondary address 366 may be used to specify any set of commands. It should be apparent that four bits may be used to specify up to sixteen distinct commands. Controllers 108a–d may be configured with appropriate hardware and/or software for transmitting, receiving, and/or executing commands specified by bits 1–4 of the secondary address 366.

If commands are encoded in the secondary address 366, as just described, a command will only be processed by a slave device if the primary address 360 is the primary address of the slave device and the R/W bit 362 is zero (write). Therefore, to read data from a slave device, in one embodiment the commands described above include an "output data" command. When a slave device reads this command, it will output one or more data bytes the next time its primary address is received followed by a R/W bit that is equal to one (read). The output data command should address a single slave device to avoid data collision and/or garbled data.

Among the advantages of various embodiments of the present invention are one or more of the following.

The ability to address multiple devices on a bus simultaneously (i.e., in a single message) may advantageously increase bus throughput and reduce bus data transfer volume by replacing redundant messages addressed to each device in a group of devices with a single message addressed to all of the devices in the group.

A related advantage is that the ability to address multiple devices on the bus at substantially the same time may enable more accurate synchronization of data operations among devices on the bus. For example, in some situations it is necessary or desirable that particular commands be executed by multiple devices on the bus 102 simultaneously. In such situations the ability to transmit a single command to multiple devices at substantially the same time increases the accuracy with which such simultaneous command execution may be achieved.

Another advantage of various embodiments of the present invention is that the techniques employed are compatible with the architectures and protocols of conventional data buses, such as the I²C bus. For example, as described above, the data bus interfaces 106a–d employed by the devices 104a–d may be conventional I²C serial bus interfaces. Although the controllers 108a–d interpret the primary addresses 110 and 116 as "primary" addresses in a scheme that employs both primary and secondary addresses, the data bus interfaces 106a–d may interpret the primary addresses 110 and 116 as if they were conventional I²C addresses. The ability to use conventional data bus controllers in devices designed according to embodiments of the present invention may simplify the design and manufacture of such devices and reduce the cost of such design and manufacture.

Furthermore, the ability to work in conjunction with standard data buses is advantageous because devices constructed according to embodiments of the present invention may be deployed for use with standard data buses without requiring the modification of such buses or the conventional devices that are attached to them. As described above in particular with respect to FIGS. 2A–2B, the techniques employed by embodiments of the present invention do not interfere with the normal operation of devices on the bus 102. As a result, both conventional devices and devices constructed according to embodiments of the present invention may operate on a data bus at the same time without difficulty.

Another advantage of various embodiments of the present invention is that any number of devices may be addressed simultaneously on the bus 102 using the techniques described herein. For example, a plurality of devices having a common primary address may be addressed simultaneously. Furthermore, a subset of devices having a common primary address may be addressed simultaneously. For example, a single device having a unique primary-secondary address pair may be addressed. As a result, the ability to address multiple devices simultaneously does not interfere with the ability of devices to address a single device on the device, and flexibility is provided with respect to the number of devices that are addressed by any particular message.

The devices 104a–d shown in FIG. 1 and described above may be any kind(s) of computing devices. Such devices include but are not limited to storage devices (such as hard disk drives and optical drives), output devices (such as monitors and printers), power supplies, and input devices (such as keyboards and mice).

Although the description herein may refer to addressing multiple devices on the bus 102 "simultaneously," it should be appreciated that the present invention is not limited to embodiments in which multiple devices are addressed simultaneously. For example, in any bus architecture, a certain amount of time is required to transmit addresses and other data over the bus. The amount of time required depends on the length of the bus and other characteristics of the bus. As a result, a particular address may reach multiple addressed devices at different times, depending on the transmission characteristics of the bus and the location of the devices on the bus. Furthermore, it should be appreciated that in various embodiments of the present invention, multiple devices are addressed "simultaneously" in the sense that they are addressed using a single message transmitted over the bus, rather than by sequentially transmitting messages to each of the addressed devices. The single message that is transmitted to multiple devices may, in particular implementations, be delivered to the multiple devices at different times according to the particular implementations of the bus, the devices on the bus, and the particular requirements of the application.

It should be appreciated that although each of the devices 104a–d is shown in FIG. 1 as having a distinct data bus interface and controller, the functionality of the data bus interface and controller in each of the devices may be implemented using a single interface or controller. For example, in one embodiment the controller and data bus interface of each of the devices 104a–d is implemented using the PIC16C72A microprocessor described above. More generally, the functionality provided by the controllers 108a–d and data bus interfaces 106a–d may be implemented using any appropriate hardware, software, or combination thereof.

The description above refers to the transmission of "messages" among devices 104a–f on the bus 102. As used herein, the term "message" refers to any unit of communication that may be transmitted by any device on the bus 102 to any one or more of the other devices on the bus 102. The protocol associated with the bus 102 typically defines a message format that is to be used to transmit messages on the bus. For example, a message typically includes an address followed by a command, which is sometimes followed by some amount of data. The command and/or data that follows the address is referred to above (e.g., in step 206 of FIG. 2A and step 262 of FIG. 2B) generically as "information" contained in the message. The present invention is not limited to transmission of any particular kind of message, or to transmission of messages using any particular bus architecture or protocol.

It is to be understood that although the invention has been described above in terms of particular embodiments, the foregoing embodiments are provided as illustrative only, and do not limit or define the scope of the invention. Various other embodiments, including but not limited to the following, are also within the scope of the claims.

What is claimed is:

1. In a computer system including a data bus and a plurality of devices coupled to the data bus, a method comprising steps of:

(A) addressing a first subset of the plurality of devices using a primary address, the primary address including a complete device address defined according to a protocol associated with the data bus, wherein the primary address is shared by the first subset of the plurality of devices;

(B) addressing a second subset of the plurality of devices using a secondary address shared by the second subset of the plurality of devices, wherein the second subset comprises a subset of the first subset; and (C) transmitting information over the data bus to the second subset of the plurality of devices.

2. The method of claim 1, wherein the step (A) comprises a step of transmitting the primary address over the data bus, and wherein the step (B) comprises a step of transmitting the secondary address over the data bus.

3. The method of claim 1, wherein the data bus comprises a serial data bus.

4. The method of claim 3, wherein the data bus comprises an $I^2C$ bus.

5. The method of claim 1, wherein the second subset comprises a single device in the first subset of the plurality of devices.

6. The method of claim 1, wherein the secondary address is implemented as a datum according to the protocol associated with the data bus.

7. In a computer system including a data bus and a plurality of devices coupled to the data bus, an apparatus comprising:

means for addressing a first subset of the plurality of devices using a primary address, the primary address including a complete device address defined according to a protocol associated with the data bus, wherein the primary address is shared by the first subset of the plurality of devices;

means for addressing a second subset of the plurality of devices using a secondary address shared by the second subset of the plurality of devices, wherein the second subset comprises a subset of the first subset; and means for transmitting information over the data bus to the second subset of the plurality of devices.

8. The apparatus of claim 7, wherein the means for addressing the first subset of the plurality of devices comprises means for transmitting over the primary address over the data bus, and wherein the means for addressing the second subset of the plurality of devices comprises means for transmitting the secondary address over the data bus.

9. The apparatus of claim 7, wherein the data bus comprises a serial data bus.

10. The apparatus of claim 9, wherein the data bus comprises an $I^2C$ bus.

11. The apparatus of claim 7, wherein the second subset comprises a single device in the first subset of the plurality of devices.

12. The apparatus of claim 7, wherein the secondary address is implemented as a datum according to the protocol associated with the data bus.

13. In a computer system including a data bus and a plurality of devices coupled to the data bus, a method performed by a first one of the plurality of devices, the method comprising steps of:

(A) receiving a primary address, including a complete device address defined according to a protocol associated with the data bus, over the data bus from a second one of the plurality of devices;

(B) receiving a secondary address over the data bus from the second one of the plurality of devices;

(C) determining whether the primary address is associated with the first one of the plurality of devices;

(D) if it is determined in the step (C) that the primary address is associated with the first one of the plurality of devices, determining whether the secondary address is associated with the first one of the plurality of devices; and (E) if it is determined in the step (D) that the secondary address is associated with the first one of the plurality of devices, receiving information from the second one of the plurality of devices over the data bus.

14. The method of claim 13, wherein the data bus comprises a serial data bus.

15. The method of claim 14, wherein the data bus comprises an $I^2C$ bus.

16. The method of claim 13, wherein the secondary address is implemented as a datum according to the protocol associated with the data bus.

17. In a computer system including a data bus and a plurality of devices coupled to the data bus, an apparatus comprising:

means for receiving a primary address, including a complete device address defined according to a protocol associated with the data bus, over the data bus from a particular one of the plurality of devices;

means for receiving a secondary address over the data bus from the particular one of the plurality of devices;

first means for determining whether the primary address is associated with the apparatus;

second means for determining, if the first means for determining determines that the primary address is associated with the apparatus, whether the secondary address is associated with the apparatus; and means for receiving information from the particular one of the plurality of devices over the data bus if the second means for determining determines that the secondary address is associated with the apparatus.

18. The apparatus of claim 17, wherein the data bus comprises a serial data bus.

19. The apparatus of claim 17, wherein the data bus comprises an $I^2C$ bus.

20. The apparatus of claim 17, wherein the secondary address is implemented as a datum according to the protocol associated with the data bus.

* * * * *